United States Patent
Etzel et al.

(10) Patent No.: US 6,233,337 B1
(45) Date of Patent: May 15, 2001

(54) METHODS AND APPARATUS FOR ENHANCED SECURITY EXPANSION OF A SECRET KEY INTO A LOOKUP TABLE FOR IMPROVED SECURITY FOR WIRELESS TELEPHONE MESSAGES

(75) Inventors: Mark H. Etzel, Harvard, MA (US); Robert John Frank, Silver Spring, MD (US); Daniel Nelson Heer, Newton, NH (US); Robert Joseph McNelis, Columbia, MD (US); Semyon B. Mizikovsky, Morganville, NJ (US); Robert John Rance, Andover, MA (US); R. Dale Shipp, Columbia, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/059,116

(22) Filed: Apr. 13, 1998

Related U.S. Application Data (60) Provisional application No. 60/043,536, filed on Apr. 14, 1997.

(51) Int. Cl.[7] ........................................ H04K 1/00
(52) U.S. Cl. .................... 380/28; 380/270; 380/247; 455/410
(58) Field of Search ........................ 380/28, 270, 247; 455/410, 411

(56) References Cited

U.S. PATENT DOCUMENTS

| | | | |
|---|---|---|---|
| 4,157,454 | * 6/1979 | Becker | 178/22 |
| 5,159,634 | * 10/1992 | Reeds, III | 380/42 |
| 5,204,902 | * 4/1993 | Reeds, III | 380/23 |
| 5,438,622 | * 8/1995 | Normile et al. | 380/46 |
| 5,724,428 | * 3/1998 | Rivest | 380/37 |
| 5,727,064 | * 3/1998 | Reeds, III | 380/43 |
| 5,835,600 | * 11/1998 | Rivest | 380/44 |

OTHER PUBLICATIONS

Schneier, Bruce, Applied Cryptography: Protocals, Algorithmsm and Source Code in C. Oct. 1995. p. 357.*

Wagner et al., "Cryptanalysis of the Cellular Message Encryption Algorithm", Mar. 20, 1997.*

TR 45.3, Appendix A to IS–54, Rev. B, "Dual–Mode Cellular System: Authentication, Message Encryption, Voice Privacy Mask Generation, Shared Secret Data Generation, A–Key Verification, and Test Data", Feb. 1992.*

* cited by examiner

*Primary Examiner*—Gail Hayes
*Assistant Examiner*—Ho S. Song (57) ABSTRACT

An enhancement to the use of a tbox function for CMEA encryption. Offsets are generated for application of the tbox function to a message, using secret values and previously encrypted message octets. The offsets are used to permute the message for application of the tbox function. For the first message of a call, the previously encrypted message octets are replaced by an initialization value. In a system employing a single iteration of CMEA encryption, first and second offsets are generated. In a system employing two iterations of CMEA encryption, first, second, third and fourth offsets are generated, with the first and second offsets being used in the first iteration of CMEA encryption and the third and fourth offsets being used in the second iteration of CMEA encryption.

16 Claims, 5 Drawing Sheets

METHODS AND APPARATUS FOR ENHANCED SECURITY EXPANSION OF A SECRET KEY INTO A LOOKUP TABLE FOR IMPROVED SECURITY FOR WIRELESS TELEPHONE MESSAGES

This application claims the benefit of U.S. Provisional application serial No. 60/043,536 filed Apr. 14, 1997. The related application entitled "Methods and Apparatus for Multiple-Iteration CMEA Encryption and Decryption for Improved Security for Wireless Telephone Messages" and filed on even date herewith is noted and incorporated by reference herein in its entirety.

FIELD OF THE INVENTION

The present invention relates generally to wireless telephone cryptography. More particularly, the invention relates to an improved security cryptosystem for rapid and secure encryption in a wireless telephone system without requiring large amounts of additional system resources.

BACKGROUND OF THE INVENTION

Wireless telephony uses messaging for several purposes including, for example, conveying status information, reconfiguring operating modes, handling call termination, and conveying system and user data such as a subscriber's electronic serial number and telephone number, as well as conversations and other data transmitted by the user. Unlike ordinary wire telephony, in which a central serving station is connected to each subscriber by wire, thus ensuring a fair degree of protection from eavesdropping and tampering by an unauthorized party (attacker), wireless telephone serving stations (i.e., base stations) must transmit and receive messages via signals over the air, regardless of the physical location of the subscribers.

Because the base station must be able to send and receive messages to and from a subscriber anywhere, the messaging process is wholly dependent on signals received from and sent to the subscriber equipment. Because the signals are transmitted over the air, they can be intercepted by an eavesdropper or interloper with the right equipment.

If a signal is transmitted by a wireless telephone in plaintext, a danger exists that an eavesdropper will intercept the signal and use it to impersonate a subscriber, or to intercept private data transmitted by the user. Such private data may include the content of conversations. Private data may also include non-voice data transmitted by the user such as, for example, computer data transmitted over a modem connected to the wireless telephone, and may also include bank account or other private user information transmitted typically by means of keypresses. An eavesdropper listening to a conversation or intercepting non-voice data may obtain private information from the user. The message content of an unencrypted telephone signal (i.e., plaintext signal) is relatively easily intercepted by a suitably adapted receiver.

Alternatively, an interloper can interject himself into an established connection by using a greater transmitting power, sending signals to the base station, and impersonating a party to the conversation.

In the absence of applying cryptography to messages being transmitted by wireless signals, unauthorized use of telephone resources, eavesdropping of messages, and impersonation of called or calling parties during a conversation are possible. Such unauthorized interloping and/or eavesdropping has in fact proven to be a grave problem and is highly undesirable.

The application of cryptography to wireless telephone applications offers a solution to the security problems discussed above, but the application of standard cryptography methods to wireless telephony has encountered significant difficulties due to the computationally-intensive nature of these methods. Specifically, these methods are subject to the constraints imposed by the desire to furnish a small wireless handset and the constraints on processing power imposed by the small size of the handset. The processing power present in typical wireless handsets is insufficient to handle the processing requirements of commonly known cryptographic algorithms such as DES (Data Encryption Standard). Implementing such a commonly known cryptographic algorithm in a typical wireless telephone system would potentially increase the time needed to process signals (i.e., encrypt and decrypt), thereby causing unacceptable delays for subscribers.

One cryptographic system for wireless telephony is disclosed in Reeds U.S. Pat. No. 5,159,634 ("Reeds"), incorporated herein by reference. Reeds describes a cryptographic process known as the CMEA ("Cellular Message Encryption Algorithm") process. Central to the operation of the CMEA is the tbox function, which expands a secret key into a secret lookup table. Beginning with an initial index, key material is combined with table material in multiple iterations to generate a secret lookup table. Once the table is generated, octets of the key are applied to octets of a message according to an algorithm described below, and the resulting value is used as an index to the lookup table. The tbox function can be implemented either as a function call or as a static memory-resident table. The table's purpose, when implemented as in the latter case, is to allow significant speed-up of encryption for a given security level.

The CMEA algorithm of the prior art may be significantly improved as described in greater detail below. These improvements provide an additional degree of security which is highly advantageous.

SUMMARY OF THE INVENTION

The present invention provides an additional degree of security to cryptographic algorithms such as CMEA through modified use of the tbox function. The improved use of the tbox function improves CMEA, and can be implemented to operate quickly and efficiently in a small computer such as is commonly used in a mobile wireless transceiver.

An improved use of the tbox function according to the present invention may suitably employ offsets to permute inputs to the tbox function. Each offset is created using two secret values and an external cryptosync value. The secret values may be generated by any of a number of techniques commonly known in the art. In some applications, the external cryptosync value used to encrypt a first message of a call is an initialization vector. For subsequent messages, the external cryptosync value is the first two octets of ciphertext from a previously encrypted message.

Improved use of tbox function according to the present invention is preferably achieved with an enhanced CMEA process employing at least two CMEA iterations. In the case of an enhanced CMEA process, first through fourth offsets are created. Each offset preferably uses a 15-bit secret value, a 16-bit secret value, and an external cryptosync value. Each offset uses a different pair of secret values. The secret values may be generated by any of a number of techniques commonly known in the art. The first and second offsets are applied to the inputs to the tbox function during a first iteration of the CMEA process, and the third and fourth offsets are applied to the inputs to the tbox function during a second iteration of the CMEA process.

Encrypted text is decrypted according to the teachings of the present invention by introducing ciphertext and reversing and inverting the steps applied to encrypt plaintext.

In another aspect of the present invention, an apparatus according to the present invention generates text and supplies it to an I/O interface which identifies it as generated text and supplies the text and the identification to an encryption/decryption processor, which in turn encrypts the text and supplies it to a transceiver for transmission. When the apparatus receives a transmission via the transceiver, the transmission is identified as incoming ciphertext, and the ciphertext and the identification are supplied to the encryption/decryption processor which decrypts the ciphertext and supplies it as text to the I/O processor for routing to its destination.

A more complete understanding of the present invention, as well as further features and advantages of the invention, will be apparent from the following Detailed Description and the accompanying drawings.

DETAILED DESCRIPTION

Figure 1:
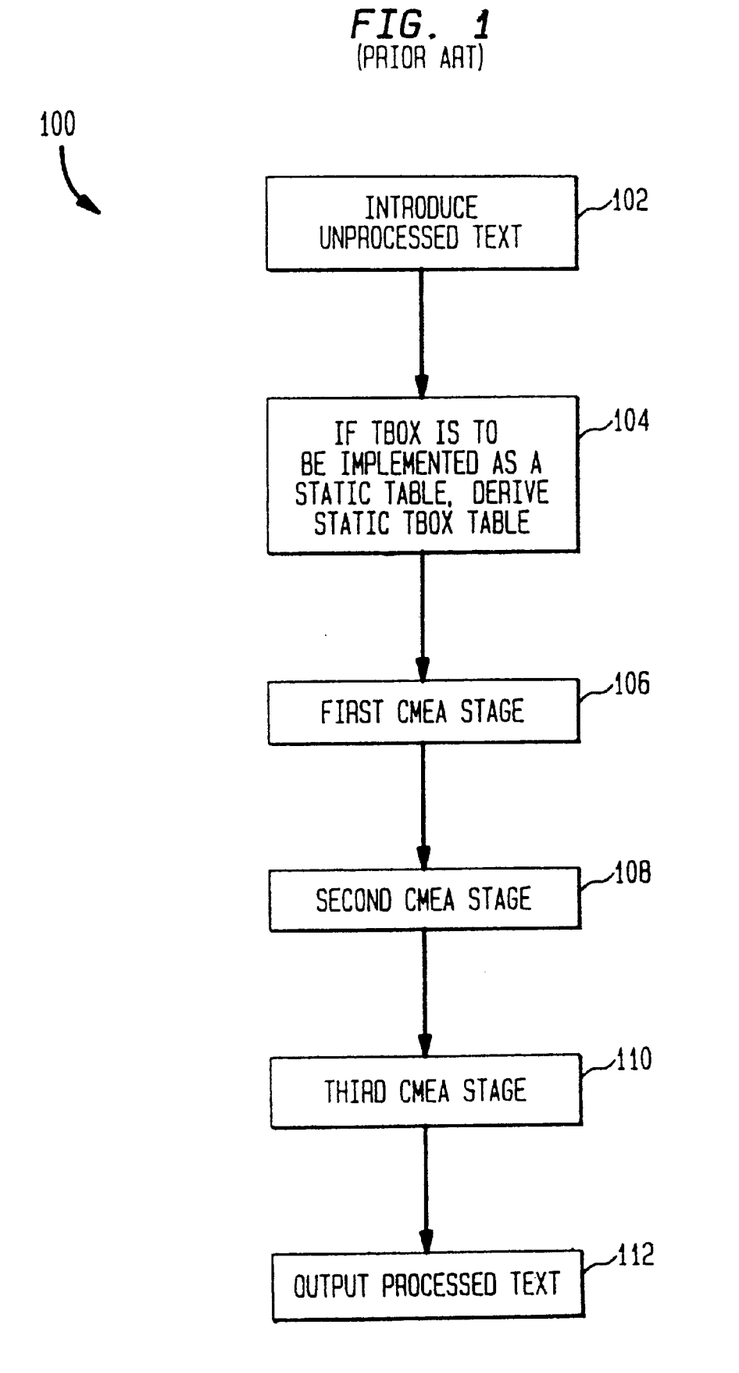
FIG. 1 is a flowchart illustrating aspects of a prior art CMEA key generation process and its utilization in a CMEA based implementation of encryption.

FIG. 1 is a flowchart illustrating a prior art method 100 using a CMEA key for encryption of certain critical user data which may be transmitted during a call. The CMEA key is used to create a secret array, tbox(z), of 256 bytes. Alternatively, the tbox function may be implemented as a function call. This reduces the use of RAM, but increases processing time by roughly an order of magnitude.

At step 102, unprocessed text is introduced. At step 104, in systems which implement tbox as a static table rather than as a function call, the static tbox table is derived. The tbox table is derived as follows:

For each z in the range $0 \leq z < 256$, tbox(z)=C(((C(((C(((C((z XOR k0)+k1)+z)XOR k2)+k3)+z)XOR k4)+k5)+z)XOR k6)+k7)+z, where "+" denotes modulo 256 addition, "XOR" is the is the bitwise boolean Exclusive-OR operator, "z" is the function argument, k0, . . . ,k7 comprise the eight octets of the CMEA key, and C( ) is the outcome of a Cellular Authentication, Voice Privacy and Encryption (CAVE) 8-bit table look-up. In the absence of the enhancements discussed below, the tbox function is well known in the art. However, the enhancements discussed in connection with FIGS. 2–5 below enable the tbox function to provide a significantly increased measure of security.

CMEA comprises three successive stages, each of which alters each byte string in the data buffer. At steps 106, 108 and 110, first, second and third stages of the CMEA process are respectively performed, as will be described herein. A data buffer d bytes long, with each byte designated by b(i), for i an integer in the range $0 \leq i < d$, is enciphered in three stages. The first stage (I) of CMEA is as follows:

1. Initialize a variable z to zero,
2. For successive integer values of i in the range $0 \leq i < d$
   a. form a variable q by: q=z $\oplus$ low order byte of i, where $\oplus$ is the bitwise boolean Exclusive-OR operator,
   b. form variable k by: k=TBOX(q),
   c. update b(i) with: b(i)=b(i)+k mod 256, and
   d. update z with: z=b(i)+z mod 256.

The second stage (II) of CMEA is:

1. for all values of i in the range $0 \leq i < (d-1)/2$:b(i)=b(i)$\oplus$(b(d-1-i) OR 1), where OR is the bitwise boolean OR operator.

The final or third stage (III) of CMEA is the decryption that is inverse of the first stage:

1. Initialize a variable z to zero,
2. For successive integer values of i in the range $0 \leq i < d$
   a. form a variable q by: q=z $\oplus$ low order byte of i,
   b. form variable k by: k=TBOX(q),
   C. update z with: z=b(i)+z mod 256, and
   d. update b(i) with b(i)=b(i)−k mod 256.

At step 112, the final processed output is provided.

The above described CMEA process is self-inverting. That is, the same steps applied in the same order are used both to encrypt plaintext and to decrypt ciphertext. Therefore, there is no need to determine whether encryption or decryption is being carried out. Unfortunately, it has been shown that the above-described CMEA process may be subject to an attack which will allow recovery of the CMEA key used for a call.

In order to provide added security to customer information, an encryption system according to the present invention improves the use of the tbox function by permuting the inputs to the tbox function by secret offsets. The improved use of the tbox function is preferably employed as part of an enhanced CMEA, or ECMEA, process, in which the message is subjected to two iterations of the CMEA process.

Figure 2:
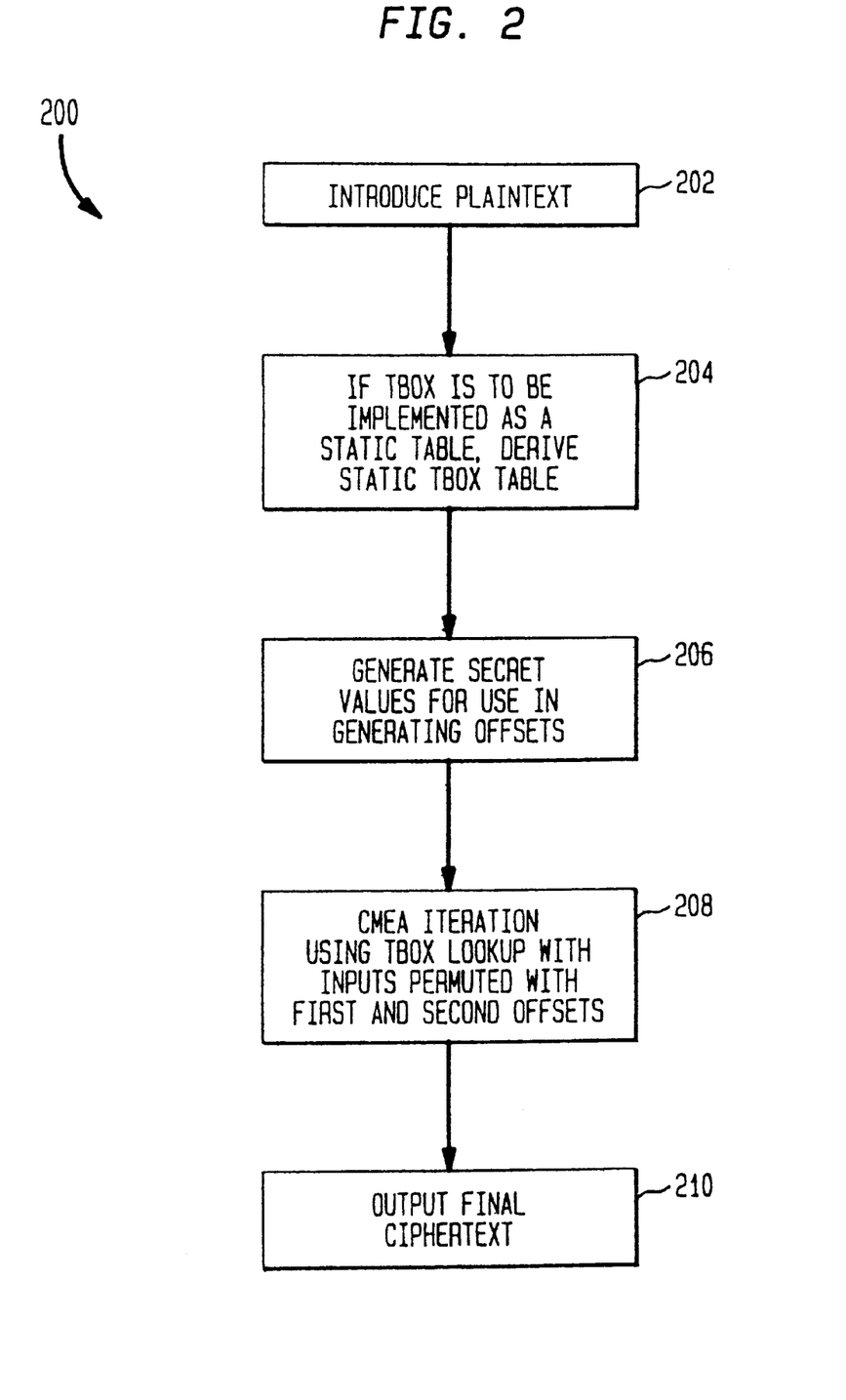
FIG. 2 is a flowchart illustrating a CMEA encryption method employing a tbox function wherein the tbox function includes a tbox lookup with the inputs to the tbox function permuted by first and second offsets in accordance with the present invention.

FIG. 2 is a flowchart showing an encryption process 200 including improved use of the tbox function according to one aspect of the present invention. In the encryption process illustrated in FIG. 2, each use of the tbox function is subjected to a permutation of the tbox function inputs using secret offsets. At step 202, the plaintext is introduced into the encryption process. At step 204, in systems which implement tbox as a static table rather than as a function call, the static tbox table is derived. At step 206, a set of secret values $K_1$–$K_4$ is generated for use in generating the secret offsets. $K_i$, i odd, are 15-bit values and $K_i$, i even, are 16-bit values. The set of secret values may be generated using any of a number of techniques commonly known in the art. All the secret values $K_1$–$K_4$ are preferably generated for each wireless telephone call and are preferably constant throughout the call. At step 208, the plaintext is subjected to an iteration of a CMEA function, using a CMEA key. The CMEA function includes a tbox function, wherein inputs to the tbox function are subjected to a permutation employing secret offsets developed using encrypted text from a previous message. Each tbox function input is subjected to a permutation to produce a permutation result. If a tbox function input is defined as x, for example, the permutation result is the value of $(((x \oplus \text{offset1})+\text{offset2}) \mod 256)$. The tbox inputs effectively result is subjected to the tbox function. Thus, for each tbox input x, the function used is tbox $(((x \oplus \text{offset1})+\text{offset2}) \mod 256)$. Offset1 and offset2 are preferably secret 8-bit values. A new set of secret offset values is preferably created for each message of a wireless call.

The secret offset values for the tbox permutations of the tbox inputs are created for the nth message of the call using the following formulas:

$$\text{offset1}_n = (((2K_1+1)*CT_{n-1}+K_2) \mod 64K) >> 8$$

$$\text{offset2}_n = (((2K_3+1)*CT_{n-1}+K_4) \mod 64K) >> 8$$

where $K_1$–$K_4$ are as defined above. The $CT_{n-1}$ values are the first two octets of the (n−1)th ciphertext message and $CT_0$ is preferably replaced by a secret 16-bit initialization value for the first message of the call. In this discussion, mod 64K is to be understood to mean mod (65,536), following conventional computer science terminology. Offset1$_n$ and offset2$_n$ are each 8-bit values. The permutation of the tbox inputs effectively causes the location of the tbox entries to shift with each message, greatly increasing the difficulty of an attack. At step 210, the final ciphertext is produced.

Figure 3:
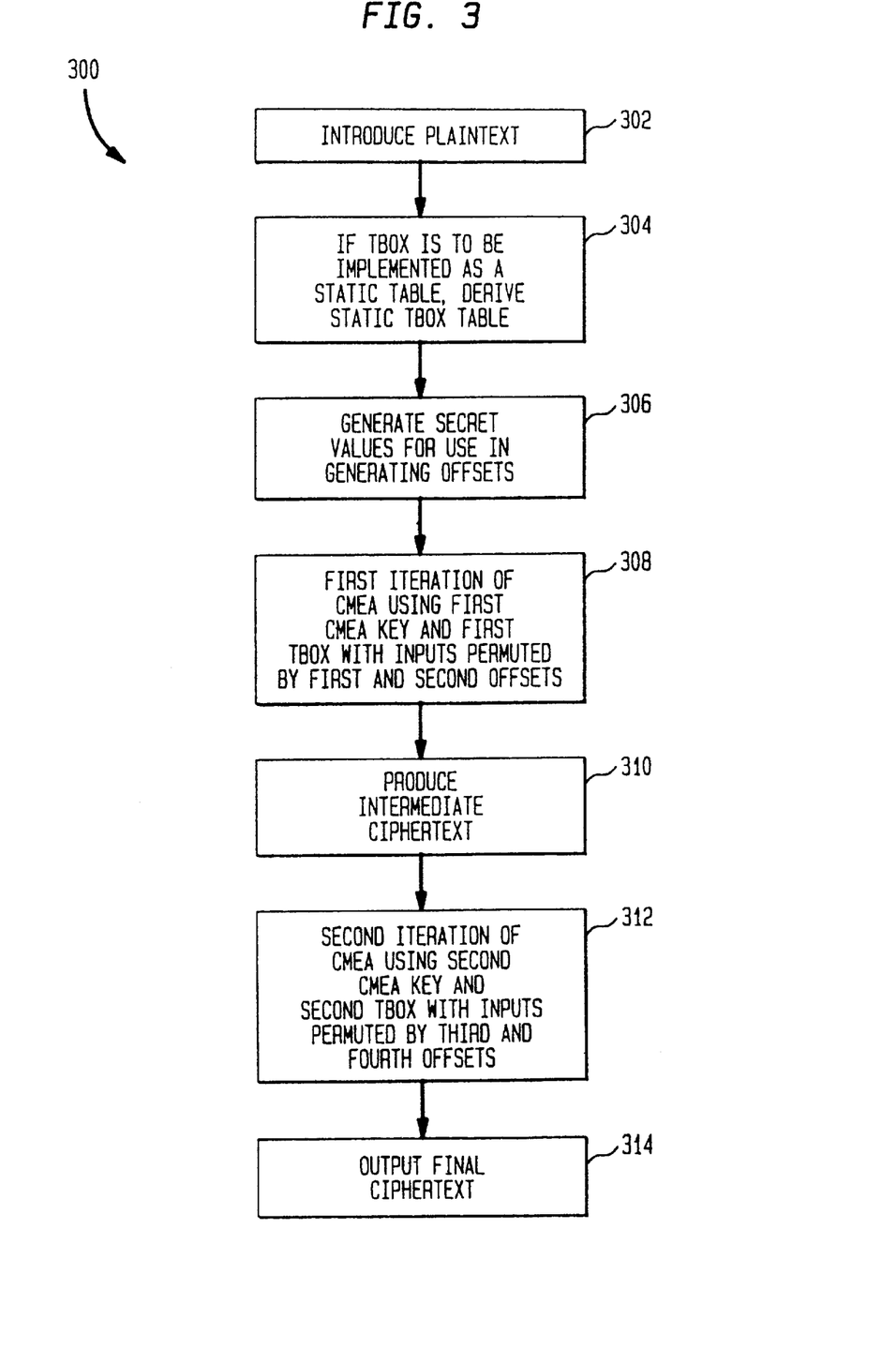
FIG. 3 is a flowchart illustrating an enhanced CMEA encryption method employing multiple CMEA iterations, each CMEA iteration employing a tbox function wherein the tbox function includes a tbox lookup with the inputs to the tbox function are permutated by first and second offsets during the first CMEA iteration, and by third and fourth offsets during the third and fourth iterations in accordance with the present invention.

FIG. 3 is a flowchart showing an encryption process 300 including improved use of the tbox function according to a further aspect of the present invention. In order to achieve added security for messages, it is preferable to employ two iterations of the CMEA function, employing first and second keys. Each iteration of the CMEA function employs an improved use of the tbox function according to the present invention. Each iteration of the CMEA function employs a different pair of secret offsets for permutation of the inputs to the tbox function.

At step 302, the plaintext is introduced into the encryption process. At step 304, in systems which implement tbox as a static table rather than as a function call, the static tbox table is derived. At step 306, a set of secret values $K_1$–$K_8$ is generated for use in generating the secret offsets. $K_i$, i odd, are 15-bit values and $K_i$, i even, are 16-bit values. The set of secret values may be generated using any of a number of techniques commonly known in the art. All the secret values $K_1$–$K_8$ are preferably generated for each wireless telephone call and are preferably constant throughout the call. At step 308, the plaintext is subjected to a first iteration of a modified CMEA process, using a first CMEA key. The use of the tbox function employed in the first iteration of the CMEA process is enhanced by permutation of the tbox inputs by first and second secret offsets. Each tbox function input is first subjected to a permutation to produce a permutation result. If a tbox function input is x, for example, the permutation result is the value of $(((x \oplus \text{offset1})+\text{offset2}) \mod 256)$. The permutation result is subjected to the tbox function. Thus, for each tbox input x, the function used is tbox $(((x \oplus \text{offset1})+\text{offset2}) \mod 256)$.

At step 310, the first iteration is completed, and an intermediate ciphertext is produced. At step 312, the intermediate ciphertext is subjected to a second iteration of the modified CMEA process, using a second CMEA key. The use of the tbox function in the second iteration process is enhanced by permutation of the tbox inputs by third and fourth secret offsets. Each tbox function input is first subjected to a permutation to produce a permutation result. If a tbox function input is x, for example, the permutation result is the value of $(((x \oplus \text{offset3})+\text{offset4}) \mod 256)$. The permutation result is subjected to the tbox function. Thus, for each tbox function input x, the function used is tbox $(((x \oplus \text{offset3})+\text{offset4}) \mod 256)$. At step 310, the second iteration is completed and the final ciphertext is produced. Offset1, offset2, offset3, and offset4 are preferably each 8-bit values. A new set of secret offset values is preferably created for each message of a wireless telephone call.

The four secret offset values for the tbox permutations are created for the nth message of the call using the following formulas:

$$\text{offset1}_n = (((2K_1+1)*CT_{n-1}+K_2) \mod 64K) >> 8$$

$$\text{offset2}_n = (((2K_3+1)*CT_{n-1}+K_4) \mod 64K) >> 8$$

$$\text{offset3}_n = (((2K_5+1)*CT_{n-1}+K_6) \mod 64K) >> 8$$

$$\text{offset4}_n = (((2K_7+1)*CT_{n-1}+K_8) \mod 64K) >> 8$$

where $K_1$–$K_8$ are as defined above. The $CT_{n-1}$ values are the first two octets of the (n−1)th ciphertext message, and $CT_0$ is preferably replaced by a 16-bit secret initialization value for the first message of the call. In the above discussion, mod 64K is again to be understood to mean mod (65,536), following conventional computer science terminology. The use of first and second offset values for the first iteration of the CMEA function, and third and fourth offset values for the second iteration of the CMEA function, causes the location of the tbox entries to shift not merely with each message, but also for each iteration of the encryption of a single message. At step 314, the final ciphertext is produced Although improved use of the tbox function according to the present invention may be employed in any application of the CMEA process and will enhance the security of the process, the enhanced CMEA process described in connection with the discussion of FIG. 3 adds further security and is preferred. Because the encryption system shown in FIG. 3 requires the successive application of two keys, it is not self-inverting. That is, the same operations applied in the same order will not either encrypt plaintext or decrypt ciphertext. Therefore, a separate decryption process is necessary, as described below.

Figure 4:
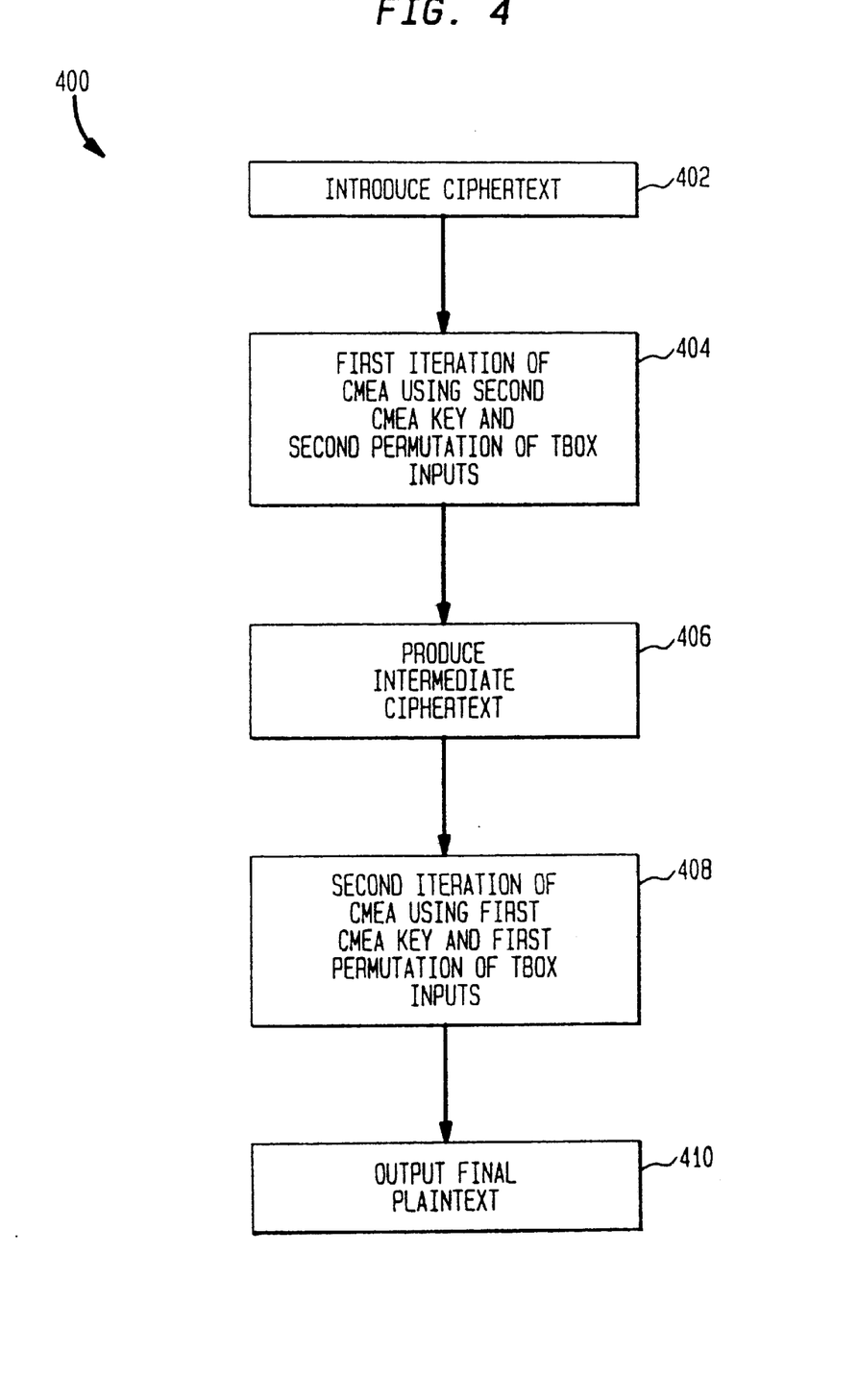
FIG. 4 is a flowchart illustrating a method in accordance with the present invention of decrypting ciphertext encrypted by an enhanced CMEA process.

FIG. 4 is a flowchart illustrating a decryption process 400 according to another aspect of the present invention. Essentially, the steps illustrated in FIG. 4 are followed, but in the reverse of the order shown in FIG. 3. At step 402, ciphertext is introduced to the decryption process. At step 404, the ciphertext is subjected to a first iteration of the CMEA process, with inputs to the tbox function being permuted by offset3 and offset4, as discussed above in connection with the discussion of FIG. 3. The key used for this first iteration is the second CMEA key. At step 406, an intermediate ciphertext is produced. Next, at step 408, the intermediate ciphertext is subjected to a second iteration of the CMEA process, with inputs to the tbox function being permuted by offset1 and offset2, as discussed above in connection with the discussion of FIG. 3. The key used for this second iteration is the first CMEA key. Finally, at step 410, plaintext is produced as an output. The first through the fourth offsets are as discussed above in connection with FIG. 3.

Figure 5:
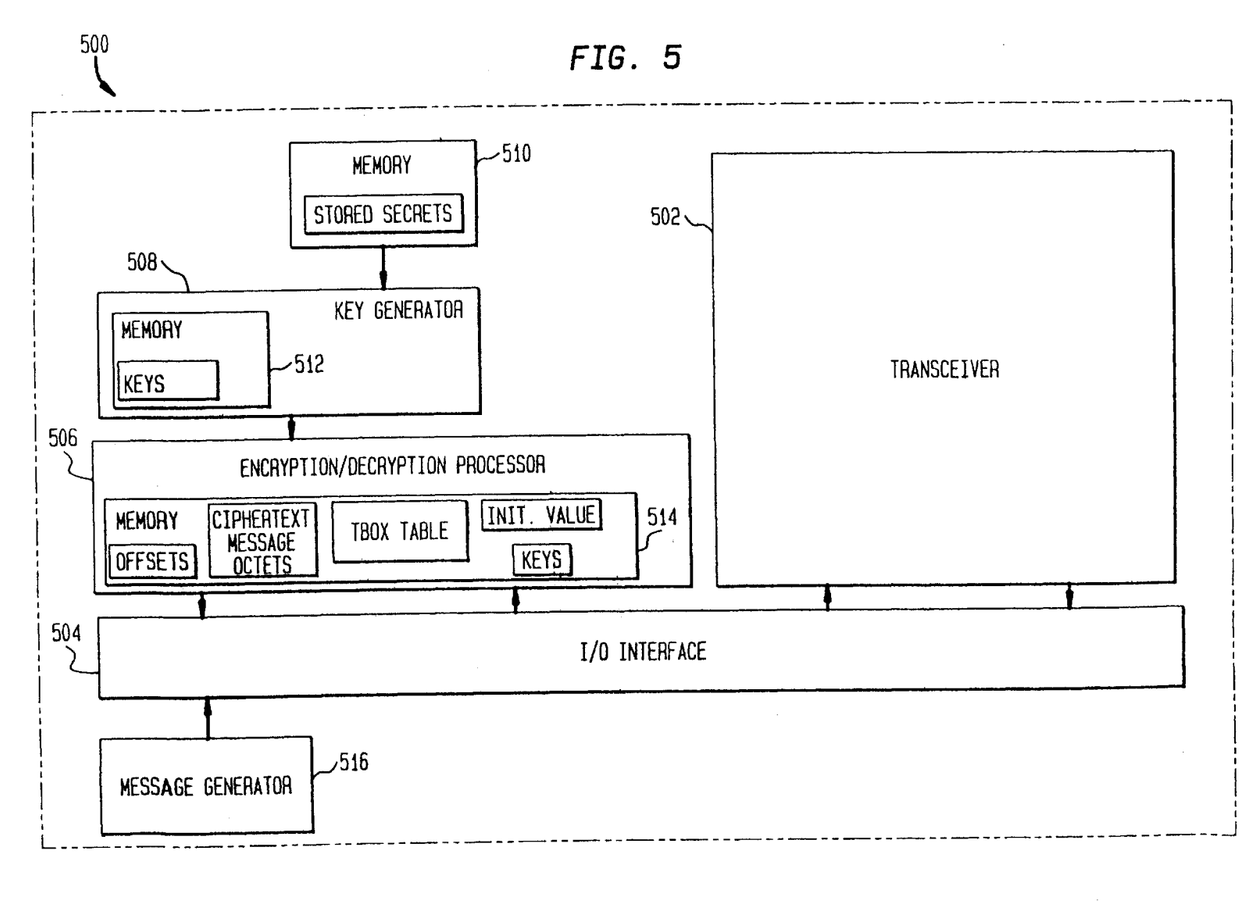
FIG. 5 is a diagram illustrating an encrypting/decrypting telephone employing enhanced CMEA encryption according to the present invention.

FIG. 5 is a diagram showing a wireless telephone set 500 equipped to perform message transmission and encryption/decryption according to the present invention, with facilities both for recognizing whether a message needs to be encrypted or decrypted, and for performing the appropriate encryption or decryption. The telephone set 500 includes a transceiver 502, an input/output (I/O) interface 504, an encryption/decryption processor 506, and a key generator 508. The key generator 508 receives and employs stored secret data for key generation. Stored secret data is preferably stored in nonvolatile memory 510 such as an EEPROM or a Flash memory. The key generator also generates secret values $K_1$–$K_8$ used to produce offsets. $K_i$, i odd, are 15-bit values, and $K_i$, i even, are 16-bit values. The key generator may be designed to generate secret values $K_1$–$K_8$ using any of a number of techniques commonly known in the art. A set of secret values $K_1$–$K_8$ is preferably generated for each wireless telephone call, and the values $K_1$–$K_8$ are preferably held constant throughout the call. The key generator 508 stores the generated keys and secret values $K_1$–$K_8$ in memory 512. The encryption/decryption processor also includes memory 514 for storage of keys received from the key generator 508, an initialization value used in production of offsets, ciphertext message octets used to produce the offsets, and a static tbox table which may be generated and used if it is desired to implement the tbox function as a static table. The telephone set 500 also includes a message generator 516, which generates messages to be encrypted by the encryption/decryption processor 506 and transmitted by the transceiver 502.

When an internally generated message is to be encrypted and transmitted by the telephone set 500, the message is transmitted from message generator 516 to the I/O interface 504. The I/O interface 504 identifies the message as an internally generated message to be encrypted and transmits the message, along with the identification, to the encryption/decryption processor 506. The encryption/decryption processor 506 receives one or more keys from the key generator 508, which it then uses to encrypt the message. Preferably, the encryption decryption processor 506 receives two keys from the key generator 508, which are then employed to perform two-iteration CMEA encryption employing an improved use of the tbox function as described above in connection with FIGS. 2 and 3.

When the encryption/decryption processor 506 receives a plaintext message from the message generator 516, the message is subjected to a first iteration of a modified CMEA process, using a first CMEA key received from the key generator 508. The inputs to the tbox function in the first iteration process are subjected to a permutation; the function used is tbox $(((x \oplus$ offset1$)+$offset2$)$ mod 256$)$. Upon completion of the first iteration an intermediate ciphertext is produced and stored in memory 514. The intermediate ciphertext is then subjected to a second iteration of the modified CMEA process, using a second CMEA key. The inputs to the tbox function in the second iteration process are subjected to a similar permutation; that is, the function used is tbox $(((x \oplus$ offset3$)+$offset4$)$ mod 256$)$. Offset1, offset2, offset3, and offset4 are preferably each 8-bit values. A set of offset values is preferably created for each message of a wireless telephone call.

The four secret offset values for the tbox permutations are created for the nth message of the call using the following formulas:

$$\text{offset1}_n = (((2K_1+1)*CT_{n-1}+K_2) \bmod 64K) >> 8$$

$$\text{offset2}_n = (((2K_3+1)*CT_{n-1}+K_4) \bmod 64K) >> 8$$

$$\text{offset3}_n = (((2K_5+1)*CT_{n-1}+K_6) \bmod 64K) >> 8$$

$$\text{offset4}_n = (((2K_7+1)*CT_{n-1}+K_8) \bmod 64K) >> 8$$

where $K_i$, i odd, are 15-bit secret values and $K_i$, i even, are 16-bit secret values, all constant for the call. The $CT_{n-1}$ values are the first two octets of the (n−1)th ciphertext message, and $CT_0$ is preferably replaced by a 16-bit secret initialization value for the first message of the call. In the above discussion, mod 64K is again to be understood to mean mod (65,536), following conventional computer science terminology. The use of first and second offset values for the first iteration of the CMEA function, and third and fourth offset values for the second iteration of the CMEA function, causes the location of the tbox entries to shift not merely with each message, but also for each iteration of the encryption of a single message.

Upon completion of the second iteration, a final ciphertext is produced and stored in memory 514, and also routed to the I/O interface 504 and to the transceiver 502 for transmission.

When an encrypted message is received by the telephone set 500 for the purpose of decryption, the transceiver 502 passes it to the I/O interface 504. The I/O interface identifies the message as an encrypted message, and passes this identification, along with the message, to the encryption/decryption processor 506. The encryption/decryption processor 506 receives one or more keys from the key generator 508 and decrypts the message, preferably using a two-iteration CMEA decryption process as described in connection with FIG. 4. When the encryption/decryption processor 506 receives ciphertext from the I/O interface 504, the ciphertext is subjected to a first iteration of the modified CMEA process, with the inputs to the tbox function being subject to a permutation using offset3 and offset4. The key used for this first iteration is the second CMEA key. An intermediate ciphertext is produced and stored in memory 514. Next, the intermediate ciphertext is subjected to a second iteration of the modified CMEA process, with the inputs to the tbox function being subject to a permutation using offset1 and offset2. The key used for this second iteration is the first CMEA key. Finally, the encryption/decryption processor 506 produces plaintext as an output and passes the message back to the I/O interface 504, where it is then routed for its ultimate use.

Depending on speed requirements and memory constraints, the telephone set may be designed to implement the tbox as a function or as a static table. Implementation of tbox as a static table requires increased memory but provides greater speed. It is also possible to design the telephone set 500 to implement a single-iteration CMEA process using a tbox function in which the inputs to the tbox function are subjected to a permutation using offset1 and offset2.

The above-described enhancements to the CMEA process, while substantially increasing security, do not substantially increase processing or system resources, and are therefore well suited to use in an environment such as a wireless telephone system. The mobile units in such systems often have limited processing power.

While the present invention is disclosed in the context of a presently preferred embodiment, it will be recognized that a wide variety of implementations may be employed by persons of ordinary skill in the art consistent with the above discussion and the claims which follow below.

We claim:

1. A method of enhanced tbox processing for each message in a call, for use in a CMEA encryption system employed in a wireless telephone system, comprising the steps of:

generating each of a first and a second offset;

subjecting each input to the tbox function to a permutation using the first and the second offset to produce a permutation result; and performing a tbox function on the permutation result.

2. The method of claim 1 wherein the step of generating the first and second offsets includes generating a plurality of secret values for each call.

3. The method of claim 2 wherein the step of generating each of the first and second offsets includes combining ones of the plurality of secret values with a pair of previously encrypted message octets for each offset, the pair of previously encrypted message octets being substituted with an initialization value for a first message of a call.

4. The method of claim 3 wherein the secret values include a 15-bit value and a 16-bit value for each offset.

5. The method of claim 4 wherein the initialization value is a 16-bit value.

6. The method of claim 5 wherein the first offset for an nth message of a call is expressed by the equation $\text{offset1}_n = (((2K_1+1)*CT_{n-1}+K_2) \mod 64K)>>8$, where $K_i$, i odd, are 15-bit secret values and $K_i$, i even, are 16-bit secret values, all constant for the call, and $CT_{n-1}$ is the first two octets of the (n−1)th ciphertext message, and wherein the second offset for an nth message of a call is expressed by the equation $\text{offset2}_n = (((2K_3+1)*CT_{n-1}+K_4) \mod 64K)>>8$, where $K_i$, i odd, are 15-bit secret values and $K_i$, i even, are 16-bit secret values, all constant for the call, and $CT_{n-1}$ is the first two octets of the (n−1)th ciphertext message, and wherein mod 64K is mod 65,536.

7. A method of enhanced tbox processing for each message in a call for use in each iteration of a two-iteration CMEA encryption system employed in a wireless telephone system, comprising the steps of:

generating each of a first and second offset for a first iteration of a CMEA process;

generating each of a third and a fourth offset for a second iteration of the CMEA process;

in the first iteration of the CMEA process, performing a permutation on each octet of the message using the first and the second offset to produce a first permutation result and performing the tbox function on the permutation result; and in the second iteration of the CMEA process, performing a permutation on each octet of the message by the third and the fourth offset to produce a second permutation result and performing the tbox function on the second permutation result.

8. The method of claim 7 wherein the step of generating the offsets includes generating a plurality of secret values for each call.

9. The method of claim 8 wherein the step of generating each of the offsets includes combining ones of the plurality of secret values with a pair of previously encrypted message octets for each offset, the pair of previously encrypted message octets being substituted with an initialization value for a first message of a call.

10. The method of claim 9 wherein the secret values include a 15-bit value and a 16-bit value for each offset.

11. The method of claim 10 wherein the initialization value is a 16-bit value.

12. The method of claim 11 wherein the first offset for an nth message of a call is expressed by the equation $\text{offset1}_n = (((2K_1+1)*CT_{n-1}+K_2) \mod 64K)>>8$, where $K_i$, i odd, are 15-bit secret values and $K_i$, i even, are 16-bit secret values, all constant for the call, and $CT_{n-1}$ is the first two octets of the (n−1)th ciphertext message, wherein the second offset for an nth message of a call is expressed by the equation $\text{offset2}_n = (((2K_3+1)*CT_{n-1}+K_4) \mod 64K)>>8$, where $K_i$, i odd, are 15-bit secret values and $K_i$, i even, are 16-bit secret values, all constant for the call, and $CT_{n-1}$ is the first two octets of the (n−1)th ciphertext message, wherein the third offset for an nth message of a call is expressed by the equation $\text{offset3}_n = (((2K_5+1)*CT_{n-1}+K_6) \mod 64K)>>8$, where $K_i$, i odd, are 15-bit secret values and $K_i$, i even, are 16-bit secret values, all constant for the call, and $CT_{n-1}$ is the first two octets of the (n−1)th ciphertext message, and wherein the fourth offset for an nth message of a call is expressed by the equation $\text{offset4}_n = (((2K_7+1)*CT_{n-1}+K_8) \mod 64K)>>8$, where $K_i$, i odd, are 15-bit secret values and $K_i$, i even, are 16-bit secret values, all constant for the call, and wherein mod 64K is mod 65,536.

13. A method of enhanced tbox processing for each message in a call for use in each iteration of a two-iteration CMEA decryption system employed in a wireless telephone system, comprising the steps of:

generating first, second, third and fourth offsets;

in a first iteration of the CMEA process, performing a permutation on each octet of the message using the third and the fourth offset to produce a first permutation result and performing the tbox function on the first permutation result; and in a second iteration of the CMEA process, performing a permutation on each octet of the message by the first and the second offset to produce a second permutation result and performing the tbox function on the second permutation result.

14. A wireless telephone set for securely transmitting messages, comprising:

a transceiver;

an input/output interface;

a key generator for generating one or more keys to be used during a call; and an encryption/decryption processor for receiving from the input/output interface a message to be encrypted or decrypted together with identification of the message as plaintext to be encrypted or ciphertext to be decrypted and encrypting or decrypting the message as appropriate using a CMEA process including a tbox function permuted by one or more secret offsets, the encryption/decryption processor being further operative to return the encrypted or decrypted message to the input/output interface for further routing.

15. The telephone set of claim 14 wherein the encryption/decryption processor is operative to encrypt a plaintext message by the steps of:

receiving a first CMEA key and a second CMEA key;

generating first, second, third and fourth offsets;

subjecting the plaintext message to a first iteration of a CMEA process using the first CMEA key, the first iteration of the CMEA process including an enhanced tbox function wherein the enhanced tbox function includes permuting a tbox address by the first and the second offset to produce a permutation result, and performing a tbox function on the permutation result;

producing and storing an intermediate ciphertext message; and subjecting the intermediate ciphertext message to a second iteration of the CMEA process using the second CMEA key, the second iteration of the CMEA process including an enhanced tbox function wherein the enhanced tbox function includes generating each of a third and a fourth offset, permuting a tbox address by the first and the second offset to produce a permutation result, and performing a tbox function on the permutation result; and producing a final ciphertext message.

16. The telephone set of claim 15 wherein the encryption/decryption processor is further operative to decrypt a ciphertext message by the steps of:

subjecting the ciphertext message to a first iteration of a CMEA process using the second CMEA key, the first iteration of the CMEA process including an enhanced tbox function wherein the enhanced tbox function includes permuting a tbox address by the third and the fourth offset to produce a permutation result, and performing a tbox function on the permutation result, the first iteration of the CMEA process producing an intermediate ciphertext message; and subjecting the intermediate ciphertext message to a second iteration of the CMEA process using the first CMEA key, the second iteration of the CMEA process including an enhanced tbox function wherein the enhanced tbox function includes permuting a tbox address by the first and the second offset to produce a permutation result, and performing a tbox function on the permutation result to produce a final plaintext message.

* * * * *